SIGNAL SEPARATING AND DELAY CIRCUIT

Filed July 30, 1963 6 Sheets-Sheet 1

INVENTOR.
WALLACE W. PRATHER
BY Moody and Kintzinger
ATTORNEYS

INVENTOR.
WALLACE W. PRATHER
BY Moody and Kurtzinger
ATTORNEYS

INVENTOR.
WALLACE W. PRATHER
BY
*Moody and Kintzinger*
ATTORNEYS

SIGNAL SEPARATING AND DELAY CIRCUIT

Filed July 30, 1963 6 Sheets-Sheet 4

INVENTOR.
WALLACE W. PRATHER

BY

Woody and Kintzinger
ATTORNEYS

June 27, 1967 W. W. PRATHER 3,328,762

SIGNAL SEPARATING AND DELAY CIRCUIT

Filed July 30, 1963 6 Sheets-Sheet 5

INVENTOR.
WALLACE W. PRATHER
BY
Moody and Kintzinger
ATTORNEYS

June 27, 1967 W. W. PRATHER 3,328,762

SIGNAL SEPARATING AND DELAY CIRCUIT

Filed July 30, 1963 6 Sheets-Sheet 6

INVENTOR.
WALLACE W. PRATHER
BY
Moody and Kintzinger
ATTORNEYS 3,328,762
SIGNAL SEPARATING AND DELAY CIRCUIT Wallace W. Prather, Cedar Rapids, Iowa, assignor to Collins Radio Company, Cedar Rapids, Iowa, a corporation of Iowa Filed July 30, 1963, Ser. No. 298,662
11 Claims. (Cl. 340—167)

ABSTRACT OF THE DISCLOSURE

A signal pulse train handling and processing circuit with signal separating and delay line means including a first delay line with an anti-coincidence circuit in its input path and a second delay line with a coincidence circuit in its input path, and an OR circuit connected for receiving multiple output tap signals from the first delay line, and with the OR circuit having an output connection back as a feedback input to the anti-coincidence circuit and also as an input to the coincidence circuit.

This invention relates to signal separation and more particularly to a signal pulse train separating system controlled by delay line means.

Conventional transponders normally produce reply signals comprising a series of information bits timewise spaced between two referencing or framing pulses and with each information bit spaced 2.9 microseconds after the start of the preceding information bit pulse or framing pulse. It has proven useful to provide transponder and transponder reply signal test sets capable of handling various different modes of operation with three different reply pulse trains, and with operation in at least one mode including additional information pulses spaced between pulses of the other operational modes. This results in pulse spacing of various information pulses of 1.45 microseconds from the start of each preceding pulse.

Analysis of such a transponder reply code structure could be accomplished by a test set utilizing the decoding system used in the commercially available Collins Radio Company equipment ATC transponder ramp test set, Collins Type 476X–1, described in Collins Instruction Book 523–0068–00, and in my earlier U.S. patent application, S.N. 139,566, now Patent No. 3,199,077, granted Aug. 3, 1965, assigned to a common assignee and filed August 21, 1961. However, analysis of a transponder reply code with pulse spacings of 1.45 microseconds requires the use of a delay line capable of substantially reproducing the input pulse train. Although such a delay line may be considered practical in some respects, it becomes quite large and expensive. It has also been found desirable to include additional second framing pulse identification pulse code checking, and to also provide an emergency reply code checking feature. These additional features impose further requirements above and beyond the normal capabilities of a conventional single delay line circuit even though it may be of such higher quality as to be able to handle information pulse spacings of 1.45 microseconds.

It is, therefore, a principal object of this invention to provide circuitry permitting code pulses to be separated by a delay line whose rise plus fall times is greater than spacing between pulses to be delayed and for passing of alternate spaced pulses as a pulse train to utilizing circuitry.

Another object is to provide pulse code train utilizing apparatus permitting pulses so closely spaced to separate alternate pulses with remaining pulses as a pulse train being passed to utilizing circuitry through one path, and the separated pulses being passed as a pulse train to utilizing circuitry through another path.

A further object is to provide such pulse code train handling circuitry in a code test apparatus also provided with second framing pulse identification reply code checking.

A still further object is to provide such a pulse code test apparatus also having emergency reply code checking circuitry.

Features of this invention useful in accomplishing the above objects include a transponder code test set capable of responding to and checking three different reply pulse train modes from IFF transponder equipment having A and B pulses spaced 2.9 microseconds apart and with intermediate C and D pulses positioned between the A and B pulses, respectively, giving a resultant 1.45 microsecond spacing in four combined pulse train 3-bit binary groups. A delay line is used having an initial framing pulse delay tap of 1.45 microseconds, with subsequent code pulse tap spacings of 2.9 microseconds, and with a delay line rise plus fall time of approximately 1.9 microseconds. These delay line taps are connected through an OR circuit to an anti-coincidence device through which the input signaling pulses passed by the anti-coincidence pulse device are applied to the delay line. Signal output of the delay line is applied to utilizing circuitry as may be appropriate. The invention also features a second delay line receiving input signaling pulses passed by a coincidence circuit controlled by the output of the OR circuit. This second delay line has output circuit means for passing output signal code pulses to utilizing circuitry as appropriate. Second frame pulse identification replay code checking is also provided with an additional tap of the first delay line with an additional delay from the last signal pulse tap of 4.35 microseconds and an overall delay of 24.65 microseconds through the delay line to a coincidence circuit having as an additional input the input signal pulse train fed as an output from the anti-coincidence circuit. The output of the coincidence circuit is then fed through an integrator to identification I/P indicating circuitry. Further emergency reply code checking is provided with an additional output from the integrator circuit to a delay gate comparator connected to a reference voltage and a gate generator of the delay gate circuit. The resultant output of the gate generator is connected to an additional coincidence circuit having its other input connection from the junction of the preceding coincidence circuit and the integrator of the identification I/P circuit. The output of the additional coincidence circuit is passed through an additional integrator to emergency code indicating circuitry.

Specific embodiments representing what are presently regarded as the best modes of carrying out the invention are illustrated in the accompanying drawings.

In the drawings:

FIGURE 1 repreesnts a block diagram of a transponder reply signal receiving signal pulse train ramp test set, capable of checking signal pulse trains with 1.45 microseconds signal pulse spacings, having a first delay line with an anti-coincidence circuit in its input path, a second delay line with a coincidence circuit in its input path, and an OR circuit;

FIGURE 2, a block diagram of a transponder reply signal pulse train checking ramp test set utilizing the same first delay line of the embodiment of FIGURE 1 the same OR circuit but with connection back from the OR circuit only to the anti-coincidence circuit and with the second delay line eliminated;

FIGURE 3, a block diagram of a second frame pulse identification reply code checking circuit that may either replace the A and B pulse decoder and code indicating circuitry of the embodiment of FIGURE 2, or be added in addition to the decode and code indicating circuitry of the embodiment of FIGURE 2, and it could be added to the decoder and code indicating circuitry of FIGURE 1, with the delay line including an additional tap at the output delayed 4.35 microseconds from the previous pulse output tap;

FIGURE 4, a block diagram of emergency reply code checking circuitry additive to the identification reply code checking circuitry of the various FIGURE 3 embodiment combinations for providing an additional emergency reply code checking capability;

FIGURE 5, a schematic of the first delay line of the FIGURE 1 embodiment and of the FIGURE 2 embodiment including an additional delay tap for the FIGURES 3 and 4 embodiments;

FIGURE 6, a schematic of the second delay line of the FIGURE 1 embodiment;

FIGURE 7, a block diagram of pulse testing apparatus as set forth in my co-pending application, S.N. 139,566, with the addition of the second delay line with connecting circuitry for providing suitable input signals to code indicating circuitry;

FIGURE 8(A), a typical transponder coded reply signal having a first and a second framing pulse and with three A information pulse bits and three B information pulse bits successively spaced from the first framing pulse to the second framing pulse at 2.9 microsecond intervals;

FIGURE 8(B), the transponder reply code of 8(A), with three C information pulses added and three D information pulses added and a resultant pulse spacing of 1.45 microseconds;

Figure 11:
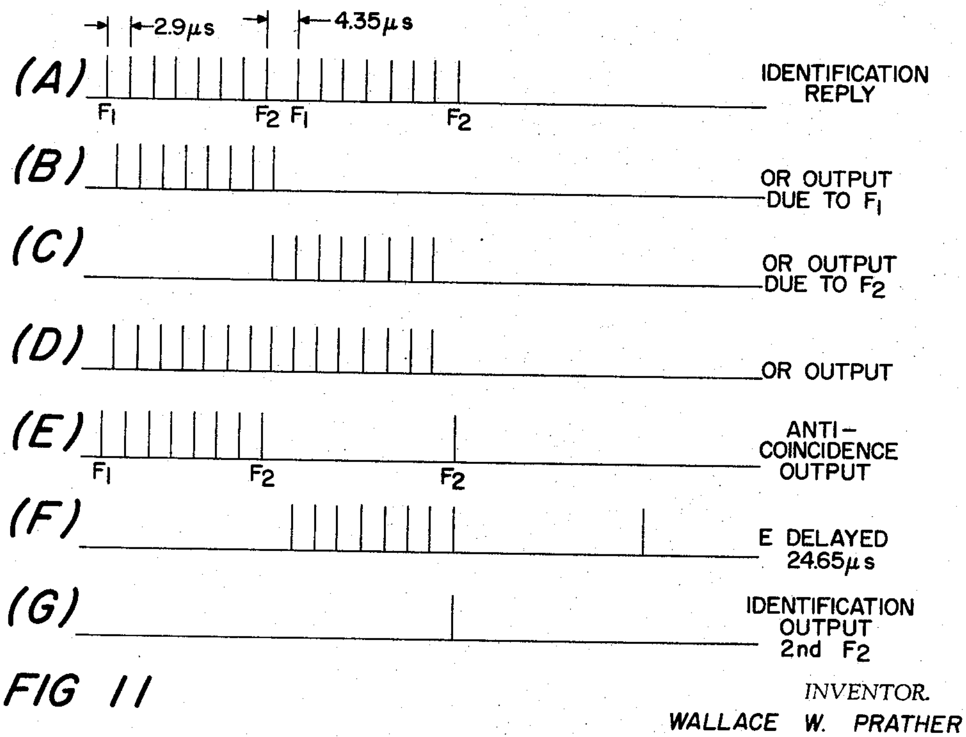
Figure 10:
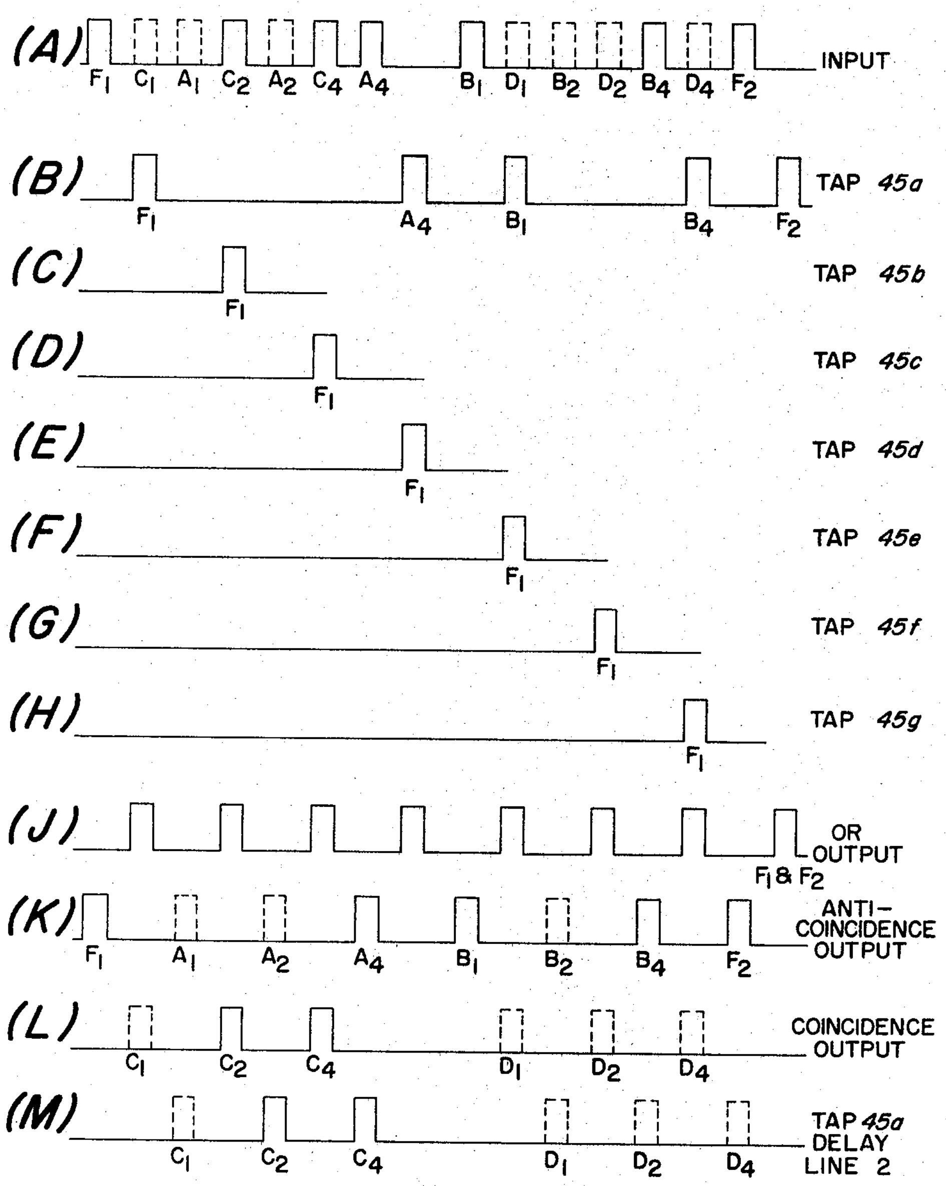
Figure 12:
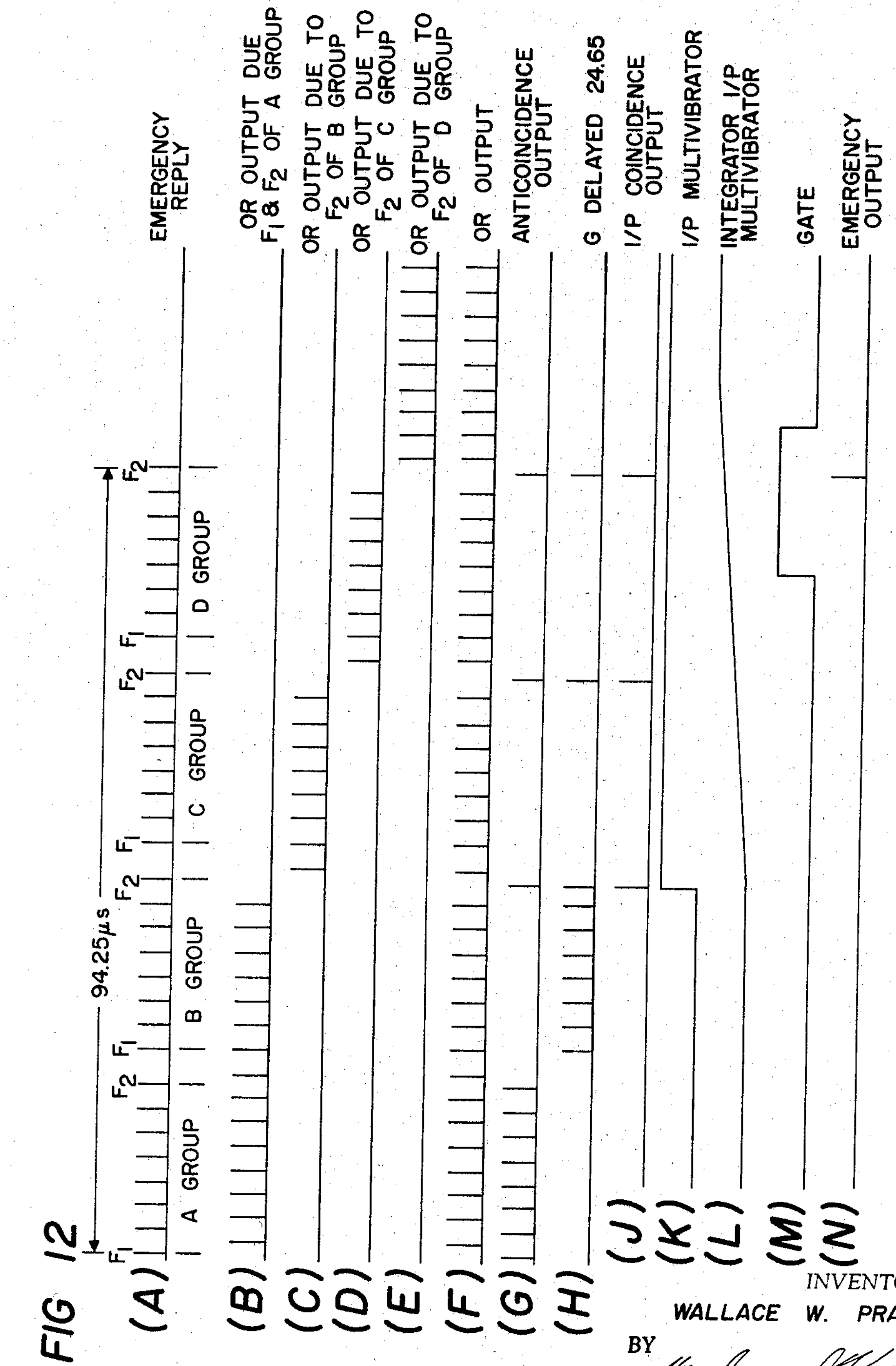

FIGURE 10, a series of waveforms with (A) the input pulse train, the first framing pulse $F_1$ appearing at the output of delay line taps (B) through (H), (J) the OR circuit output, (K) the anti-coincidence circuit output waveform, (L) the coincidence circuit output, and (M) the output of the first tap of the second delay line; in FIGURE 11 are waveforms for identification reply code checking with waveform (A) the identification reply code pulse train, (B) the OR circuit output due to $F_1$, (C) pulses at the output of the OR circuit due to $F_2$, (D) the resultant combined OR output due to $F_1$ and $F_2$, (E) the resulting anti-coincidence output, (F) is E delayed 24.65 microseconds, and (G) the ultimate identification output second $F_2$ indicating pulse; and in FIGURE 12 are waveforms for emergency reply code checking with (A) the emergency reply code, (B) through (E) OR circuit outputs due to the A, B, C, and D pulse code groups, respectively, of the four group input signal, and (F) the resultant OR circuit output, (G) the anti-coincidence output, (H) is G delayed 24.65 microseconds, (J) the identification coincidence output, (K) the identification code triggered multivibrator waveform, (L) the integrated multivibrator output, (M) a gate waveform, and (N) a resulting emergency output signal pulse.

Figure 1:
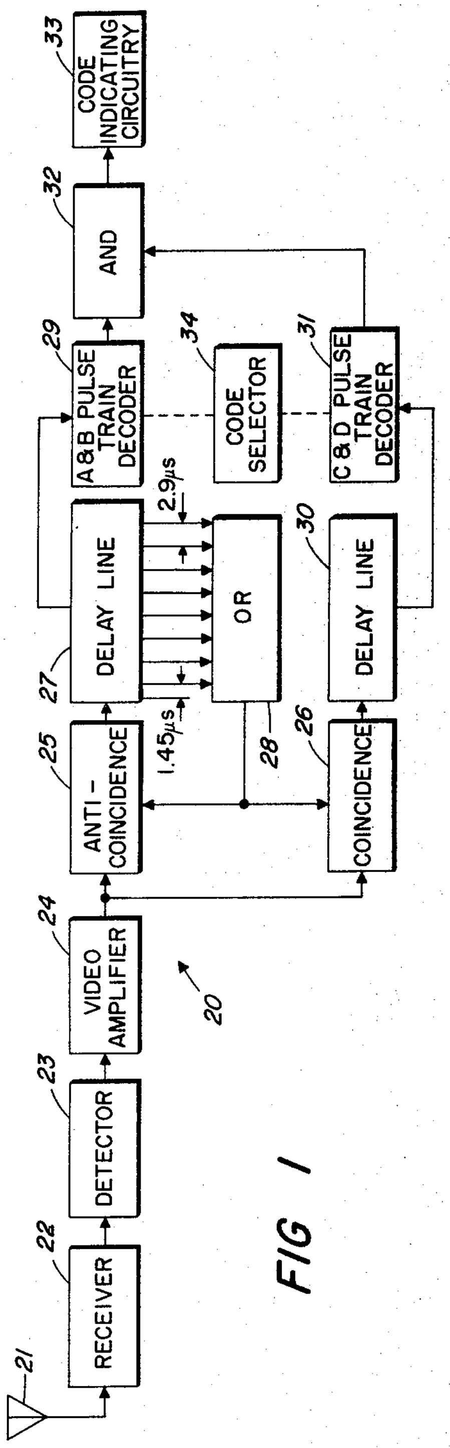

Referring to the drawings:

The transponder reply signal ramp test set 20 of FIGURE 1 receives an RF signal from antenna 21. The transponder reply RF signal received is fed through RF receiver 22, pulse signal detector 23, and video amplifier 24 to provide transponder originated signal code pulses as an input to code anti-coincidence circuit 25 and coincidence circuit 26. Signals received may be the conventional ATC type transponder reply code of FIGURE 8(A) having first and second framing pulses and three pulse A and B information pulse trains and code pulse interval spacings of 2.9 microseconds. However, signals may be received as shown in FIGURE 8(B) having three pulse C and D pulse train groups interspaced between the ATC transponder reply code pulses for an ATC-IFF transponder reply code with resulting 1.45 microsecond pulse interval spacings.

The output of anti-coincidence circuit 25 is fed to a delay line 27 having a first tap delayed 1.45 microseconds and succeeding code pulse taps spaced 2.9 microseconds, successively, and having rise plus fall times of approximately 1.9 microseconds. The rise plus fall times of 1.9 microseconds is greater than the 1.45 microsecond pulse spacing in some of the code input signals and would normally require a much higher quality delay line than usually used in code test sets. The first tap of delay line 27 and the succeeding 2.9 microsecond spaced taps of delay line 27 are connected to and through OR circuit 28 back as an additional input to anti-coincidence circuit 25 and also as an additional input to coincidence circuit 26. This permits utilization of a delay line 27 having 2.9 microsecond spacings since alternate pulses spaced 1.45 microseconds do not pass through anticoincidence circuit 25. The multiple tap outputs of delay line 27 are coupled to A and B pulse train decoder 29 (the single output lead shown in FIGURE 1 is used to indicate the multiple tap outputs for convenience). The output of coincidence circuit 26 is fed to a second delay line 30 having multiple output taps (as represented by a single output lead in FIGURE 1) coupled to C and D pulse train decoder 31. The outputs of pulse train decoders 29 and 31 are both applied to AND circuit 32 from which an output is applied to code indicating circuitry 33 for indicating action as appropriate in response to code signals applied through the ramp test set 20. Code selector 34 may be set for any of various code pulse combinations in the series of code settings available and used (this is similar to the code selection apparatus illustrated and described in my co-pending earlier filed U.S. patent application, S.N. 139,566).

Figure 2:
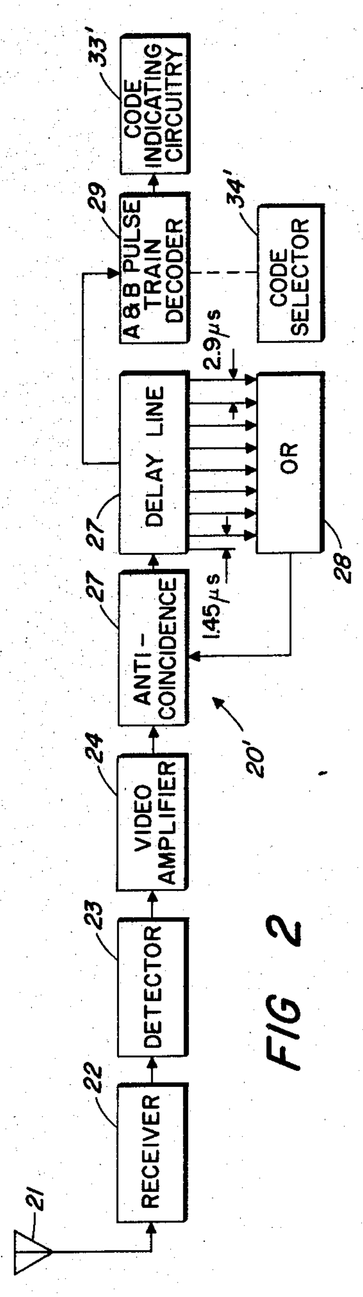

In the embodiment of FIGURE 2, components duplicating those in the embodiments of FIGURE 1 are, for the sake of convenience, numbered the same. In this embodiment, OR circuit 28 is connected for application of its output only back to anti-coincidence circuit 25. Code selector 34' is connected for selecting code train replies only in A and B pulse train decoder 29 from which an output activates code indicating circuitry 33' as appropriate. The separated code pulse train circuit, of FIGURE 1, including coincidence circuit 26, delay line 30, and the C and D pulse train decoder 31 is omitted.

Figure 3:
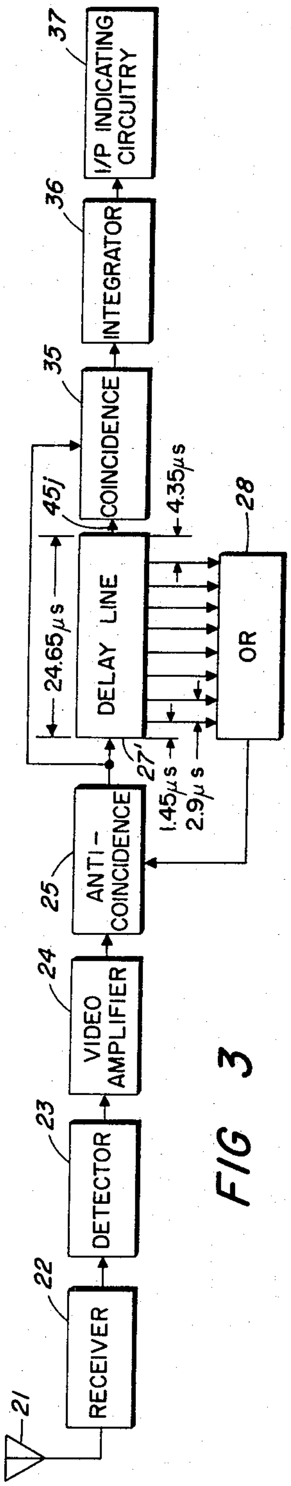

In the circuitry of FIGURE 3, components duplicating those in the embodiments of FIGURES 1 and 2 are, for the sake of convenience, numbered the same. This illustrates circuitry for transponder code frame pulse identification reply code checking including a coincidence circuit 35 with the pulse signal train outputs of anti-coincidence circuit 25 applied as one input, and with an additional tap **45*j*, delayed 4.35 microseconds from the previous pulse output tap of delay line 27', another input. The output of the coincidence circuit 35 is applied through an integrator circuit 36 to identification I/P indicating circuitry 37 for indicating actuation by appropriate signal inputs from integrator 36**. It should be noted that this second frame pulse identification reply code checking circuitry may replace the A and B pulse decoder and code indicating circuitry of the FIGURE 2 embodiment if only an identification I/P indicating signal is required, or it may be added to the embodiment of FIGURE 2 to provide its signal checking capabilities in addition to the code indicating and checking capabilities of the FIGURE 2 embodiment. Furthermore, it could be added, in addition, to the decoder and code indicating circuitry of FIGURE 1 for additional checking capabilities.

Figure 4:
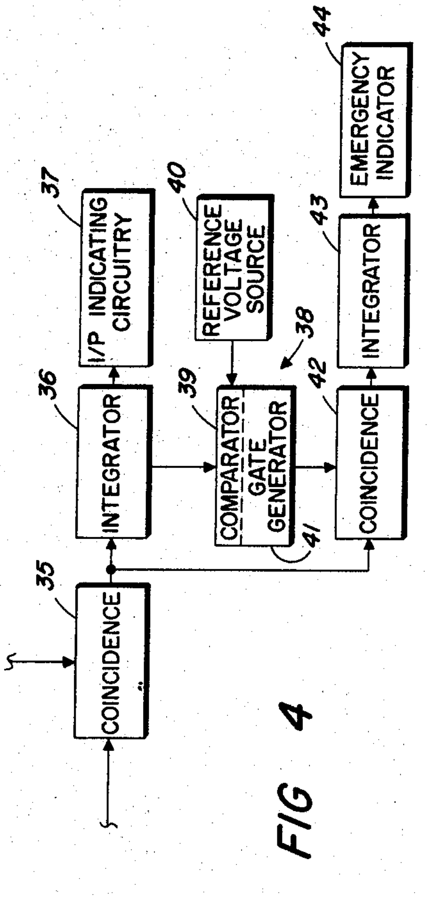

In FIGURE 4, with circuitry for providing an additional emergency reply code checking capbility, components duplicating those of FIGURE 3, and of the FIGURES 1 and 2 embodiments are, for the sake of convenience, numbered the same. An additional output of multivibrator integrator circuit 36 is applied as input to delay gate 38 including first, a comparator 39 connected to a reference voltage source 40, and second, a gate generator 41 for developing an output applied as an input to coincidence circuit 42. The output signal of previous coincidence circuit 35 is applied as an additional input to coincidence circuit 42 for developing an output signal when appropriate. The output of coincidence circuit 42 is applied to multivibrator integrator circuit 43 and when appropriate through circuit 43 to the emergency code indicator circuit 44.

Figure 5:
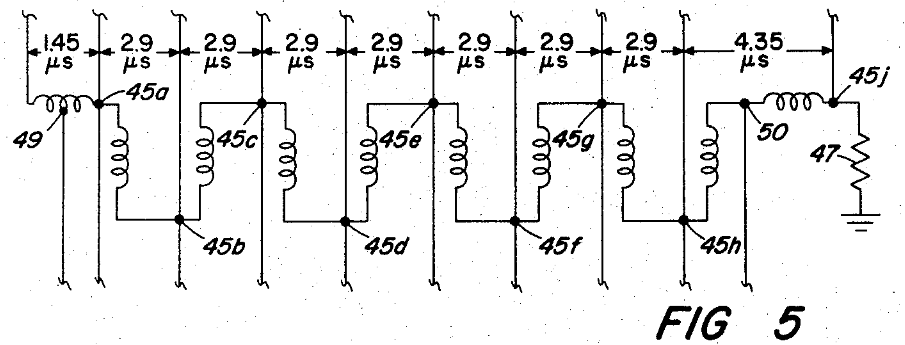

The delay line illustrated in FIGURE 5 may be utilized for delay line 27 with its first pulse output tap 45*a* delayed 1.45 microseconds from the input and with succeeding pulse information and framing taps 45*b* through 45*h* spaced at intervals of 2.9 microseconds. It may be utilized for delay line 27′ particularly with the addition of an output tap 45*j* delayed 4.35 microseconds from the previous pulse output tap and 24.65 microseconds from the signal input line.

Figure 6:
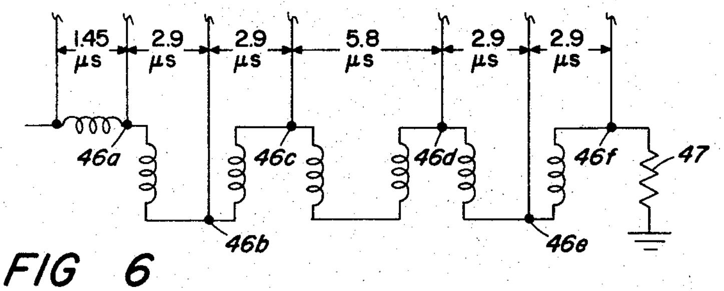

Referring also to FIGURE 6, the second delay line of FIGURE 1 is shown with a first tap 46*a* delayed 1.45 microseconds from the signal input line, and with successive taps 46*b* and 46*c* spaced at 2.9 microsecond intervals. The next succeeding output tap 46*d* is spaced at an interval of 5.8 microseconds from the immediately preceding tap 46*c*, and the two remaining successive taps, 46*e* and 46*f* are spaced at successive intervals thereafter of 2.9 microseconds. Both delay lines may be terminated in a conventional manner as by a resistor 47 to ground.

Figure 7:
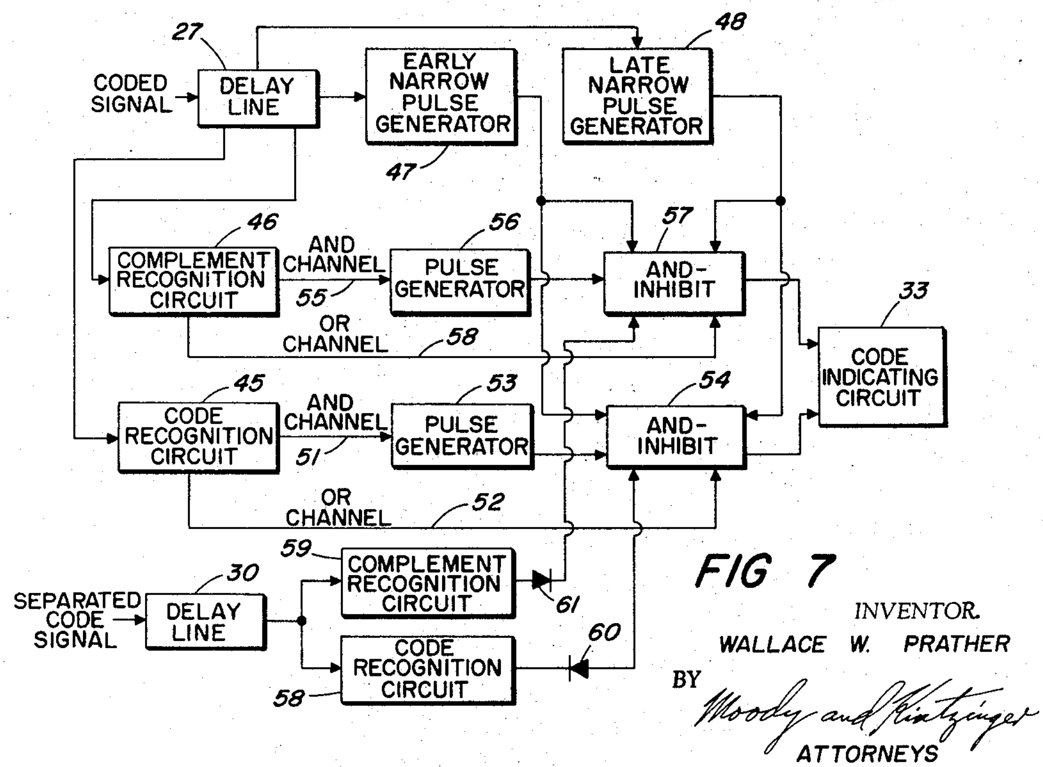

Referring also to FIGURE 7, it is to be appreciated that while part of the testing apparatus is particularly useful in decoding reply signal components of a transponder having two framing pulses and six information bits and with a second delay line circuit six additional information bits, it could be used equally well, for example, to decode other pulse coding signals regardless of the number of information bits utilized and could decode such information bits in the absence of framing pulses, if desirable. The code recognition and decoding functions through the circuitry illustrated in FIGURE 7, is quite similar in structure and operation with the structure illustrated in FIGURE 1 of my co-pending U.S. patent application, S.N. 139,566.

The multiple outputs of delay line 27 (although only single output leads are used to indicate multiple outputs in FIGURE 7) are coupled to code recognition circuit 45 and complement coded signal recognition circuit 46. The delay tap 49 of the delay line of FIGURE 5, with a delay between the input signal and 1.45 microseconds, is connected to early narrow pulse generator 47, and an additional tap 50 of the delay line, between taps 45*h* and 45*j*, is connected to the late narrow pulse generator 48.

Decode recognition circuit 45, includes, essentially, a code AND channel 51 and a code OR channel 52. Code AND channel 51 includes coincidence circuitry wherein each framing pulse and information bit (including both pulses and simulated pulses) must occur simultaneously at all eight inputs from delay line 27 to produce an output signal. The OR channel 52 includes circuitry wherein coincidence is not required and passes information through any unblocked diode thereof. The output from the code AND channel 51 is applied to pulse generator 53 where a comparatively wide pulse of opposite polarity is generated and coupled to the AND-INHIBIT gate 54. The OR channel output from code recognition circuit 45 is also applied to the AND-INHIBIT gate 54 along with output pulses from the early narrow pulse generator 47 and the late narrow pulse generator 48. If the framing pulses are correct as to spacing, and if the information bits are of the correct state as to pulse or no pulse, an output pulse will be coupled from the AND-INHIBIT gate 54 to code indicating circuitry 33.

Complement recognition circuitry 46 may be substantially identical to code recognition circuitry 45 and the AND channel output 55 therefrom coupled to pulse generator 56. The output from pulse generator 56 is coupled to AND-INHIBIT gate 57 as is the output from the OR channel 58 along with the output pulses from early narrow pulse generator 47 and the late narrow pulse generator 48. The output rfom the AND-INHIBIT gate 57, like that of the AND-INHIBIT gate 54, is coupled to code indicating circuitry 33.

The output tap leads as represented by a single line in FIGURE 1 of delay line 30, are coupled as inputs to code recognition circuit 58 and the complement recognition circuit 59. These are similar in structure and function to the code recognition circuit 45 and the complement recognition circuit 46, respectively. The output signal pulses are passed from code recognition circuit 58 through a diode 60, connected cathode to code recognition circuit 58, to AND-INHIBIT gate 54 as an additional input thereto for activation, as appropriate, of code indicating circuitry 33. The complement recognition circuit 59 is connected through diode 61, connected anode to complement recognition circuit 59, to AND-INHIBIT gate 57 as an additional pulse signal input thereto for activation, as appropriate, of code indicating circuitry 33.

Figure 8:
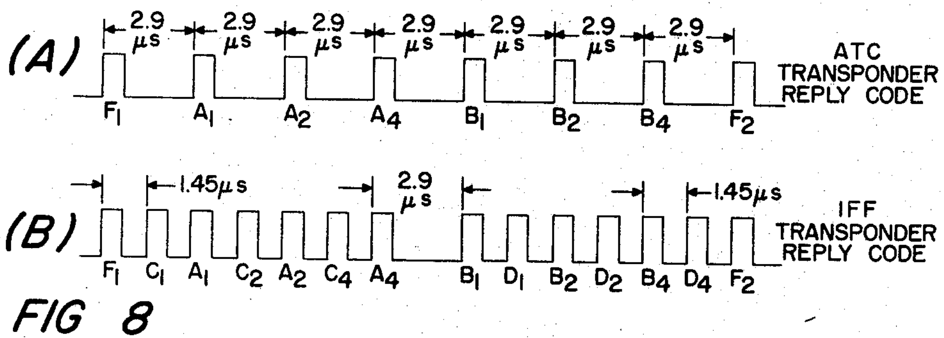

Operation of the various embodiments may be more clearly understood when operational waveforms are considered. Referring again to FIGURE 8, pulse trains out of video amplifier 24 resulting from signals received at antenna 21 may be any of three different reply pulse trains (or modes) any of the different forms of the pulse trains or any combination of the three trains. One pulse train could be a basic ATC transponder reply code pulse train such as shown in FIGURE 8(A), a second could be the same, similar, or different, and a third pulse train could contain as many as six additional information pulses such as shown in FIGURE 8(B). The FIGURE 8(A) type pulse train contains first and second framing pulses and three-bit binary A and B information pulse groups, and with the FIGURE 8(B) pulse train the addition of three-bit binary C and D information pulse groups. Pulses with the FIGURE 8(A) input signal are spaced at intervals of 2.9 microseconds while the spacings with the FIGURE 8(B) waveforms include intervals of 1.45 microseconds. Here, again, it might be noted that analysis of either of the code structures of FIGURES 8(A) and (B) could be accomplished by expanding the decoding system described in my copending U.S. patent application, Ser. No. 139,566, provided a higher quality delay line was incorporated that would faithfully substantially reproduce the input pulse train. While this may appear practical in some respects, it results in a delay line quite large and expensive and incapable of the addition of other signal code checking capabilities provided in various embodiments with applicant's present system.

Figure 9:
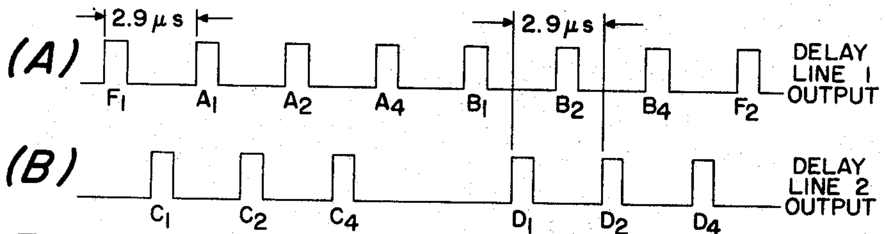
FIGURE 9(A) illustrates the form of the first delay line output appearing at each output tap according to its corresponding time delay.
FIGURE 9(B) illustrates the form of the second delay line output appearing at each output tap according to its corresponding time delay.

In applicant's present system, used in the embodiment of FIGURE 1, two delay lines with a physical volume approximately equal to that required by a single and adequate quality line are provided at about one-third the cost of the quality line. Obviously, in the embodiment of FIGURE 2, with only one delay line being utilized the cost would be reduced even further along with a beneficial reduction of physical volume. Any C or D pulses interspersed between pulses of the FIGURE 8(A) waveform are separated from the waveform being passed to delay line 27, in the embodiments of FIGURES 1 and 2, or 27′, in other embodiments. With a waveform input signal having a complete A, B, C, and D pulse groups, as shown in FIGURE 8(B), the resulting separation of C and D pulses from the incoming pulse train results in the two pulse trains shown as FIGURES 9(A) and (B) with each having pulse train intervals of 2.9 microseconds. Thus, the apparent time separation between consecutive pulses in the input pulse train has been doubled to thereby permit the use of a delay line producing pulses spaced 2.9 microseconds, an interval actually greater than the rise plus fall times of 1.9 microseconds in the delay line. This rise plus fall time, on the other hand, is actually greater than the 1.45 microsecond pulse interval spacings in the FIGURE 8(B) pulse signal input waveform. Such separation of closely spaced pulses into separated pulse train wider spacings is accomplished in both the FIGURE 1 and FIGURE 2 embodiments.

This is illustrated quite well by the operational waveforms shown in FIGURE 10 where FIGURE 10(A) is a typical selected predetermined transponder originated pulse train input code signal having $F_1$ and $F_2$ framing pulses, only one A, one B, two C, and no D information pulses. This input pulse train waveform is applied simultaneously to anti-coincidence circuit 25 and coincidence circuit 26 in the embodiment of FIGURE 1 and only to anti-coincidence circuit 25 in the embodiment of FIGURE 2, although it may be also applied to other circuitry in other embodiments having additional code operating and/or checking capabilities. The resulting waveforms appearing at taps 45*a* through 45*h* include the $F_1$ and $F_2$ pulses and all A and B pulses in the input signal applied to the anti-coincidence circuit, as shown with the first tap 45*a* output waveform (B) of FIGURE 10. This waveform would also appear at each of the other taps 45*b* through 45*h* of the delay line 27 with the respective delay line intervals. The delay at the first tap 45*a* is 1.45 microseconds, and with the succeeding taps 45*b* through 45*h*, the delay is successively 2.9 microseconds. This is illustrated quite well by the delay positions indicated for the waveform positions by the successive positions of $F_1$ in FIGURES 10(B) through 10(G). $F_1$ appears at the output taps of the delay line 27 at all times it is applied with an input signal train since no INHIBIT signal is present to block $F_1$ from passage through anti-coincidence circuit 25. The signal pulses $F_1$, and A and B information pulses, and $f_2$ in the signal input pulse train appear in the output from each tap 45*a* through 45*h* applied to the OR circuit 28, and result in an output from the OR circuit substantially as shown by FIGURE 10(J). This OR circuit output is primarily due to the $F_1$ pulses, although any A and B pulses present will be in line with pulses occurring at other output taps, and the last pulse shown in FIGURE 10(J) is the delayed $F_1$ pulse of tap 45*h* in coincidence with the $F_2$ pulse appearing at the 45*a* tap output. It should be noted that there should be seven more pulses continuing to the right due at least to $F_2$ appearing at various tap outputs 45*b* through 45*h* and/or due to various A and B signals appearing at various output taps.

The resulting action of the anti-coincidence circuit results in a signal pulse train output passed to delay line 27 as indicated in FIGURE 10(K) with only the pulses $F_1$, $A_4$, $B_1$, $B_4$, and $F_2$ remaining, and with each reproduced in their respective time delayed positions at the respective output taps 45*a* through 45*h*. The resultant output of the coincidence circuit is shown in FIGURE 10(F) with only pulses $C_2$ and $C_4$ remaining. The output appearing at the first tap 46*a* of delay line 30 is delayed 1.45 microseconds from the waveform FIGURE 10(L) as shown by FIGURE 10(M). Obviously, this waveform with pulses $C_2$ and $C_4$ would also appear at taps 46*b* and 46*c* delayed successively at 2.9 microsecond intervals, and at tap 46*d* with a further delay from 46*c* of 5.8 microseconds, and at taps 46*e* and 46*f* at further successive intervals of 2.9 microseconds. These outputs of the delay lines 27 and 30 particularly with the initial delay of 1.45 microseconds in the second delay line 30 are brought into synchronism for comparison of the outputs from the A and B, and C and D pulse train decoders 29 and 31, with synchronous checking through the AND circuit 32 and actuation of code indicating circuitry 33, as appropriate, in indicating the presence or absence of each information pulse. Obviously, in the embodiment of FIGURE 2, any C and D pulses in the output of amplifier 24 are ignored, and pulse train checking is only of A and B pulse content. The $F_1$ and $F_2$ framing pulses through the A and B pulse train decoder may also be utilized in the FIGURE 2 embodiment for actuation of code indicating circuitry 33' and/or for the additional identification I/P indicating, and emergency reply code checking capabilities in other embodiments.

Please refer now to FIGURE 11, again to the embodiments of FIGURE 3 and FIGURE 4, and to various combinations of these additional circuit provisions with the embodiments of FIGURES 1 and 2 for providing an additional identification reply code checking circuit. The input signal pulse train is shown as having two groups with framing pulses $F_1$ and $F_2$, and with three-bit A pulses and B pulses in each of the two groups with 2.9 microsecond pulse intervals. Each group is the same as the ATC transponder reply code of FIGURE 8(A) and the second group is spaced at an interval of 4.35 microseconds behind the start of the second framing pulse $F_2$ of the first pulse group. The presence of both framing pulses $F_2$ is checked. The resulting output of OR circuit 28 in both the FIGURE 1 and FIGURE 2 embodiments as well as the different variation embodiments as hereinbefore presented is shown by FIGURE 11(D). This OR circuit output is the combined result through the OR circuit of the delayed $F_1$ pulses appearing at output taps 45*a* through 45*j* of delay line 27 as shown in FIGURE 11(B) and the corresponding outputs due to the framing pulse $F_2$ of the first group appearing at the output taps 45*a* through 45*j* as shown in FIGURE 11(C). It might be noted that FIGURE 11(D) is identical to FIGURE 10(J) with the seven additional pulses present at the output of the OR circuit 28 shown. The resulting INHIBIT action through anti-coincidence circuit 25 resulting from the OR circuit output acting on the input pulse train signal to anti-coincidence circuit 25 provides the output applied as an input to delay line 27 as shown in FIGURE 11(E). The resultant output from additional tap 45*j* of delay line 27, indicated as being delay line 27' in FIGURE 3, gives the output waveform as shown in FIGURE 11(F), actually delayed 24.65 microseconds. Then the presence of both framing pulses $F_2$ is determined by application of the waveforms FIGURES 11(E) and 11(F) to coincidence circuits 35. With coincidence of the two $F_2$'s in waveform FIGURES 11(E) and 11(F), the output pulse waveform FIGURE 11(G) appears in the output of coincidence circuit 35 for activating integrator 36 and identification I/P indicating circuitry 37.

Please refer now to FIGURE 12 and again to FIGURE 4 for further information of emergency reply pulse train checking capabilities made possible with applicant's delay line and signal diverting circuitry just as with the various embodiments associated with the FIGURE 3 embodiment. This emergency reply train checking capability requires an input of a four group A, B, C, and D group pulse train, each group possibly a reproduction of the FIGURE 8(A) pulse train with each having framing pulses $F_1$ and $F_2$ and each possibly including A and B bit pulses. The existence of the four complete pulse train groups of this emergency code are determined by checking the presence of the second framing pulse of the D group, the last of the four groups. FIGURE 12(A) is the waveform of the emergency reply signal train with the second framing pulse of the D group occurring 94.25 microseconds after the start of the first reply framing pulse of the A group and 2.9 microseconds after the start of the last information pulse in the D group. Furthermore, each interval spacing between framing pulses $F_2$ and $F_1$, of the next succeeding pulse group, is 4.35 microseconds. Although, the second framing pulse of the D group could be detected by developing a gate pulse approximately 2.9 microseconds wide and centered about the $F_2$ pulse of the D group the accuracy requirements of gate width and position are too stringent with total variation limited to $\pm 2.3$ microseconds. It is particularly advantageous then that the pulse separating system inherent in applicant's invention, via outputs of delay lines 27', the OR circuit 28, and anti-coincidence circuit 25, permits the detection of the D group framing pulse $F_2$ by relatively inaccurate circuits. FIGURES 12(B) through 12(H) are pulse train waveforms generated by the emergency reply code FIGURE 12(A) through the action of the anti-coincidence circuit 25, and delay line 27′ along with the OR circuit 28 in substantially the same action as hereinbefore described for the embodiment of FIGURE 3 and for the identification checking function illustrated by the FIGURE 11 waveforms. Waveforms FIGURES 12(B) through 12(E) illustrate the generation of the OR circuit 28 output waveform FIGURE 12(F). The resultant waveform output FIGURE 12(G) of anti-coincidence circuit 25 and the waveform FIGURE 12(H) of tap **45*j* or delay line 27′, waveform G delayed 24.65 microseconds, are applied to coincidence circuit 35 to provide coincidence circuit output FIGURE 12(J). The first pulse of the I/P coincidence circuit 35 output waveform FIGURE 12(J) triggers integrator circuit 36 (actually an I/P multivibrator) to produce the long pulse waveform FIGURE 12(K). This long positive output pulse of integrator 36 is then integrated by an RC circuit in integrator 36 to provide output waveform FIGURE 12(L). The FIGURE 12(L) waveform out of integrator 36 is then applied to the comparator portion 39 of gate circuit 38 for comparison with the voltage of reference voltage source 40 to produce in gate generator 41 a gate waveform FIGURE 12(M) whose time position is determined by the comparison of the reference voltage and the integrated waveform FIGURE 12(L). The resulting output waveform FIGURE 12(M) from gate generator 41 and the output of coincidence circuit 35 are compared in the additional coincidence circuit 42 to produce the emergency output pulse waveform FIGURE 12(N), thus indicating coincidence with the last framing pulse $F_2$ of the D group. This emergency output waveform FIGURE 12(M) pulse triggers an emergency multivibrator in integrator 43 in a conventional manner for generating a long pulse integrated and amplified for actuating the emergency indicator 44, as appropriate. It should be noted that the time separation interval for the pulses in waveform FIGURE 12(J) is 24.65 microseconds. Thus, the time position of gate waveform FIGURE 12(M) may be relatively inaccurate and theoretically may vary ±24 microseconds as compared to the ±2.3 microsecond limitation indicated above for another checking system for the emergency reply signal train. Furthermore, the novel emergency reply signal train checking system advantageously checks the presence of all four $F_2$ framing pulses since all four pulse groups must be present to operate the emergency indicator. For example, if $F_2$ of the A group is missing, $F_2$ of the second group will be applied to the delay line 27′** and the gate waveform FIGURE 12(M) will be delayed 24.65 microseconds to therefore result in no coincidence between the waveform FIGURES 12(M) and 12(J). The results are similar if $F_2$ of the B and/or C groups is missing.

Thus, there are herein provided various signal pulse train code checking embodiments all utilizing a basic input anti-coincidence circuit, delay line, and delay line output OR circuit connected back to the anti-coincidence circuit system for desired separation of pulses from an input signal pulse code train, utilization of the remaining pulses of the input signal out of the anti-coincidence circuit in code utilizing and/or checking circuitry as appropriate. Furthermore, with some embodiments the basic circuit is utilized to separate pulses from the input signal pulse train having closer spacings than the rise plus fall times of the delay line with a resultant separation of such signal input pulse trains into pulse trains of greater spacing for handling by delay lines with lower quality requirements, and in some embodiments application of a separated portion of the input signal pulse train through a second delay line for additional decoding and checking as appropriate. It should be noted that this basic circuitry could well be applicable to signal code handling in computers and other systems, and possibly not for decoding, but possibly for computer function utilization other and distinct from decoding and indicating functions.

Whereas, this invention is here illustrated and described with respect to several embodiments thereof, it should be realized that various changes may be made without departing from the essential contributions to the art made by the teachings hereof.

I claim:

1. In a signal pulse train handling and processing circuit: signal pulse train input means; an anti-coincidence circuit, delay line, and OR circuit loop; with the anti-coincidence circuit connected for receiving a signal pulse train input from said input means; with the delay line including multiple successive delay output taps having predetermined time interval spacings; said OR circuit being connected for receiving the output of said multiple delay output taps having predetermined time interval spacings and for applying signal pulses of the multiple delay output taps connected to the OR circuit back as a feedback input to the anti-coincidence circuit; and means for coupling multiple outputs of said circuit loop to signal pulse utilizing circuitry; wherein said utilizing circuitry is connected to multiple delay output taps of said delay line and includes pulse train decoding means responsive to input signal pulse train content passed by said anti-coincidence circuit and by the delay line for decoding in said pulse train decoding means; and code responsive circuitry connected to receive output signals from said pulse train decoding means; and wherein a second signal path includes: a coincidence circuit; a second delay line; and additional signal pulse train decoding means; said coincidence circuit being connected for receiving the same signal pulse train input from said input means also applied as an input to the anti-coincidence circuit; the output of said OR circuit being connected as an additional input to said coincidence circuit; said second delay line having multiple successive delay output taps, with predetermined time interval spacings, connected to said additional decoding means; and with both the pulse train decoding means and the additional decoding means connected to decoder output utilizing circuitry.

2. The signal pulse train handling and processing circuit of claim 1, wherein said signal pulse train input means is equipped to receive signal pulse train inputs having pulse signal content consistent with the predetermined time interval spacings of the multiple delay output taps of both delay lines and for applying such signal inputs as inputs to both the said anti-coincidence circuit and the said coincidence circuit.

3. The signal pulse train handling and processing circuit of claim 2, wherein the delay line of the circuit loop is provided with an additional late delay output tap connected to additional output utilizing circuitry, and wherein the output of the anti-coincidence circuit is also connected as an input to said additional utilizing circuitry.

4. The signal pulse train handling and processing circuit of claim 3, wherein the additional utilizing circuitry includes, successively, a coincidence circuit, to which the output of the anti-coincidence circuit and the additional late delay tap are connected as inputs thereto; an integrator circuit; and an indicating circuit.

5. The signal pulse train handling and processing circuitry of claim 3, wherein the additional utilizing circuitry includes, successively: a first coincidence circuit, to which the output of the anti-coincidence circuit and the additional late delay tap are connected as inputs; a first integrator circuit; a delay gate, with a voltage comparator section connected to the output of said first integrator, and to a reference voltage source, and a gate generator having an output applied to a second coincidence circuit in the additional utilizing circuitry; with the output of the first coincidence circuit of the additional utilizing circuitry being connected to the second coincidence circuit; and successively, a second integrator; and an emergency indicator circuit.

6. The signal pulse train handling and processing circuitry of claim 5, wherein the first integrator has an additional output directly connected to I/P indicating circuitry.

7. In signal pulse train handling and processing circuitry, signal separating and delay means including: an anti-coincidence circuit, delay line, and OR circuit loop; with the delay line including multiple successive delay output taps having predetermined time interval spacing; said OR circuit being connected for receiving the output of various of said multiple delay output taps having predetermined time interval spacings and for applying signal pulses of the multiple delay output taps connected to the OR circuit back as a feedback input to the anti-coincidence circuit; and also including a second signal path with, successively, a coincidence circuit, and a second delay line having multiple successive delay output taps; signal pulse train input means connected to both said anti-coincidence circuit and to said coincidence circuit; the output of said OR circuit being connected as an additional input to said coincidence circuit in addition to its feedback connection with the anti-coincidence circuit; signal pulse utilizing circuitry connected to multiple outputs of said circuit loop; and signal pulse utilizing means connected to multiple delay taps of said second delay line.

8. The signal pulse train handling and processing circuitry of claim 7, wherein said signal pulse train input means is equipped to receive signal pulse train inputs having pulse signal content consistent with the predetermined time interval spacings of the multiple delay output taps of both delay lines and for applying such signal inputs as inputs to both the said anti-coincidence circuit and the said coincidence circuit.

9. The signal pulse train handling and processing circuitry of claim 8, wherein the delay line of the circuit loop is provided with an additional late delay output tap connected to additional output utilizing circuitry, and wherein the output of the anti-coincidence circuit is also connected as an input to said additional utilizing circuitry.

10. The signal pulse train handling and processing circuitry of claim 9, wherein the additional utilizing circuitry includes, successively, a coincidence circuit, to which the output of the anti-coincidence circuit and the additional late delay tap are connected as inputs thereto; an integrator circuit; and an indicating circuit.

11. In signal pulse train handling and processing circuitry, signal separating and delay means including: an anti-coincidence circuit, delay line, and OR circuit loop; with the delay line including multiple successive delay output taps having predetermined time interval spacings; said OR circuit being connected for receiving the output of various of said multiple delay output taps having predetermined time interval spacings and for applying signal pulses of the multiple delay output taps connected to the OR circuit back as a feedback input to the anti-coincidence circuit; and wherein the delay line of the circuit loop is provided with a late delay output tap connected to utilizing circuitry, and wherein the output of the anti-coincidence circuit is connected as an additional input to the utilizing circuitry.

References Cited

UNITED STATES PATENTS

| | | | |
|---|---|---|---|
| 2,752,507 | 6/1956 | Dureau | 328—119 |
| 2,984,706 | 5/1961 | Jamison et al. | 340—167 |
| 3,156,895 | 11/1964 | Fiske et al. | 340—167 X |
| 3,167,771 | 1/1965 | Cunningham | 328—108 X |

NEIL C. READ, *Primary Examiner.*

D. YUSKO, *Assistant Examiner.*